(12) United States Patent
Smith et al.

(10) Patent No.: US 10,237,682 B2
(45) Date of Patent: Mar. 19, 2019

(54) MULTI-SIGNAL GEOMETRIC LOCATION SENSING FOR ACCESS CONTROL

(71) Applicant: INTEL CORPORATION, Santa Clara, CA (US)

(72) Inventors: Ned M. Smith, Beaverton, OR (US); Micah J. Sheller, Hillsboro, OR (US); Nathan Heldt-Sheller, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 15/480,058

(22) Filed: Apr. 5, 2017

(65) Prior Publication Data

US 2017/0374509 A1    Dec. 28, 2017

Related U.S. Application Data

(63) Continuation of application No. 14/572,576, filed on Dec. 16, 2014, now Pat. No. 9,648,457.

(51) Int. Cl.
*H04W 4/021* (2018.01)
*H04W 12/08* (2009.01)

(52) U.S. Cl.
CPC .......... *H04W 4/021* (2013.01); *H04W 12/08* (2013.01)

(58) Field of Classification Search
CPC ...................................................... H04W 4/021
USPC ........................................................ 455/456.1
See application file for complete search history.

(56) References Cited

U.S. PATENT DOCUMENTS

| | | | |
|---|---|---|---|
| 7,496,346 B2 * | 2/2009 | Oswal | H04L 63/102 370/338 |
| 9,510,146 B1 * | 11/2016 | Amir | H04W 4/021 |
| 9,642,572 B2 * | 5/2017 | Mahfouz | G16H 50/50 |
| 9,713,006 B2 * | 7/2017 | Chastain | H04W 12/04 |
| 2007/0156918 A1 | 7/2007 | Philyaw | |
| 2013/0093627 A1 * | 4/2013 | Cosman | H04W 64/00 342/451 |
| 2014/0253389 A1 * | 9/2014 | Beauregard | G01S 5/02 342/458 |

OTHER PUBLICATIONS

Supplementary European Search Report for European Application No. 15870610, dated Apr. 16, 2018, 2 pages.

* cited by examiner

*Primary Examiner* — Qutbuddin Ghulamali

(57) ABSTRACT

Various embodiments are generally directed to the provision and use of geometric location based security systems that use multiple beacons for determining a location. A beacon transmitted from an ultrasound broadcast as well as one or more different wireless broadcasts can be used to geo-locate a device and provide access controls based on the geo-location.

22 Claims, 10 Drawing Sheets

MULTI-SIGNAL GEOMETRIC LOCATION SENSING FOR ACCESS CONTROL

CROSS-REFERENCE TO RELATED APPLICATION

This application is a continuation of, claims the benefit of, and claims priority to U.S. patent application Ser. No. 14/572,576, filed Dec. 16, 2014, the subject matter of which is incorporated herein by reference in its entirety.

TECHNICAL FIELD

Embodiments described herein generally relate to security and access control and particularly to access control based on geometric location sensing.

BACKGROUND

Some security access control systems implement location based security policies (sometimes referred to as geo-location security). Such geo-location security can offer increased (or relaxed) access constraints when the subject (user) is within the geo-location boundary. Geo-location security policies are typically specified using maps or other similar representations of a physical space. A location of the subject is referenced against this map and appropriate security measures can be taken. The location of the subject is typically determined using a location sensing technology (e.g., GPS, WiFi, GPRS, Bluetooth, etc.) that can be triangulated.

Triangulation methods, however, are an approximation of an actual location. More specifically, triangulation methods provide a relatively poor approximation of an actual geometric shape, within which a geo-location policy is intended to protect. Furthermore, variations in radio broadcast strength as well as variations in receiver reception can affect the accuracy of the estimated location of the subject. More particularly, the actual subject location (with respect to the resources to be protected within a geometric area) may differ from the determined or reported location due to the above stated considerations.

A difference between an actual location and a determined location can result in misapplication of geo-location security policies. For example, access may be granted when it should not have been or access may be denied when it should have been granted. The former is a security policy violation and the later is an inconvenience to the user. Users may respond to inconveniences by violating security settings in order to improve convenience. Hence, both examples often result in violations of security policies.

It is with respect to these and other considerations that the embodiments described herein are needed.

DETAILED DESCRIPTION

Figure 1:
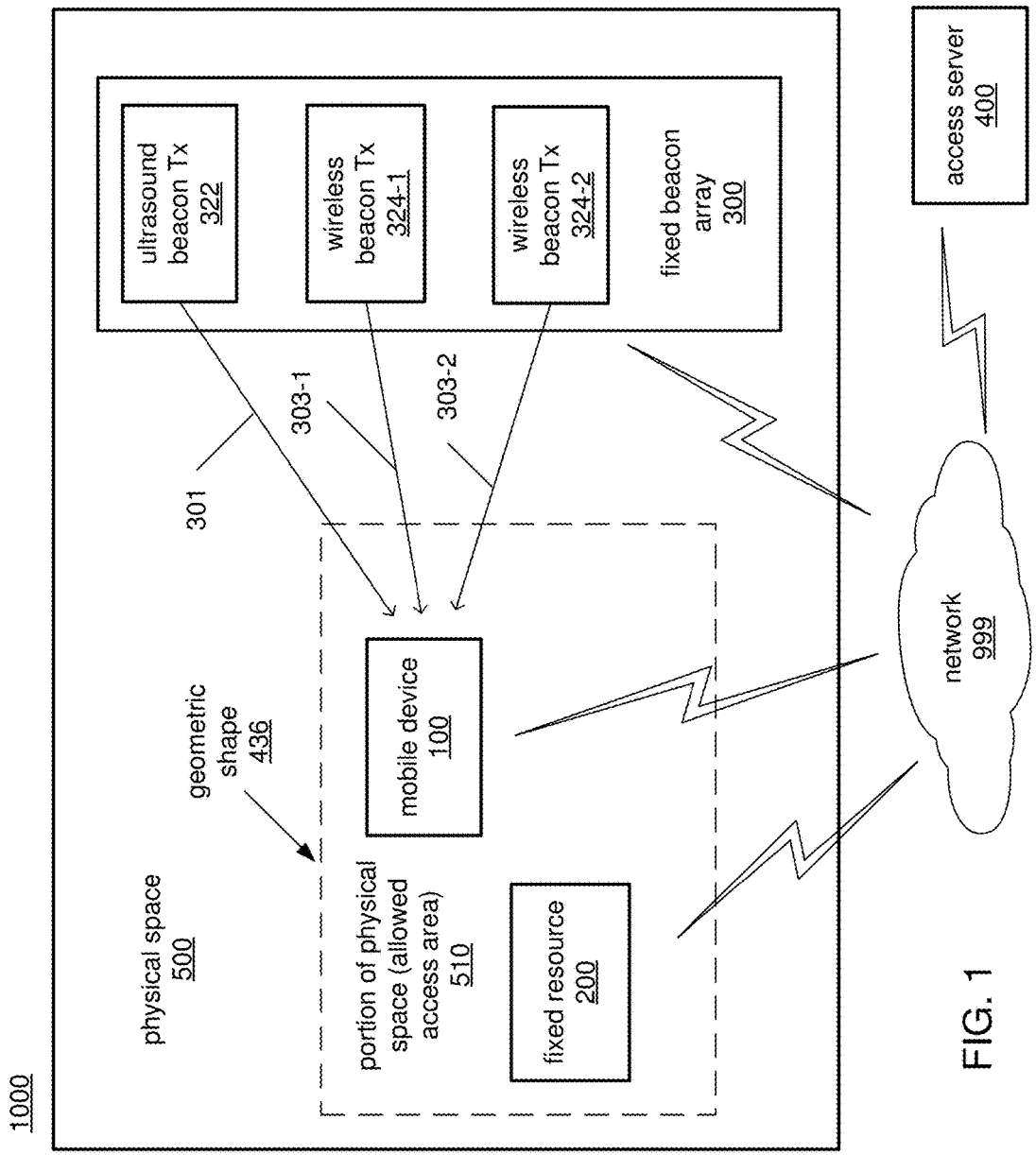
FIGS. 1-2 each illustrate embodiments of a geo-location access control system.

Various embodiments are generally directed to the provision and use of geometric location (geo-location) based security systems. In general, the geo-location security system receives beacons transmitted from an ultrasound broadcast as well as one or more different wireless broadcasts. For example, some systems may be configured to receive an ultrasound broadcast, an RF broadcast (e.g., Bluetooth, WiFi, GPRS, GPS, or the like), and/or an infrared (IR) broadcast. The system can then construct a geometric shape based on the ultrasound broadcast, the RF broadcast, and/or the IR broadcast, and align the geometric shape with a map of a physical space to determine a location of a device or user.

The present disclosure can provide access to a fixed resource or access to a mobile device based on the constructed geometric shape and a geometric access policy corresponding to the physical space. For example, a request to access a fixed resource in the physical space may be received from a mobile device. The system may determine a location of the mobile device based on the broadcasts and determine whether to grant access to the fixed resource based on a determination that the mobile device is within a portion of the physical space in which access to the fixed resource is authorized. Similarly, a request to access the mobile device may be received from the fixed resource. The system may determine a location of the mobile device based on the broadcasts and determine whether to grant access to the mobile device based on a determination that the mobile device is within a portion of the physical space in which access by the fixed resource is authorized.

With general reference to notations and nomenclature used herein, portions of the detailed description that follow may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may incorporate a general computing device. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

Figure 2:
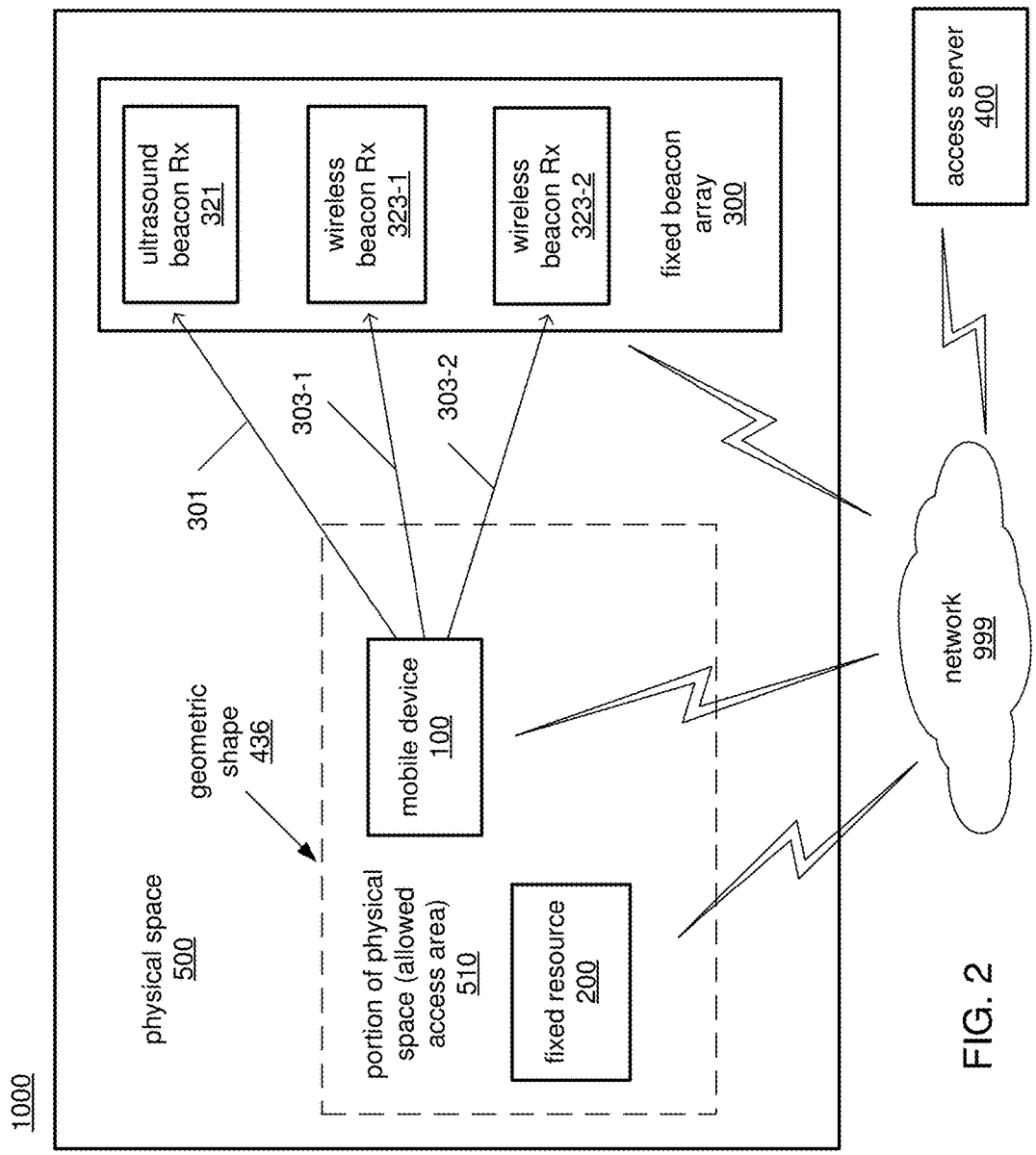

FIGS. 1-6 depict block diagrams of interactions among devices of a geo-location access control system 1000. In general, FIGS. 1-2 illustrate the system 1000, which implements a geo-location security policy that relies on multiple beacons to determine the location of a mobile device. In particular, FIG. 1 illustrates a mobile device accessing a fixed resource, and fixed beacons transmitting wireless broadcasts to determine the geo-location of the mobile device while FIG. 2 illustrates the fixed resource accessing the mobile device, and fixed beacons receiving wireless broadcasts from the mobile device to determine the geo-location of the mobile device. It is important to note, that the fixed beacons may either transmit or receive broadcasts and the mobile device may either access or be accessed by the fixed resource. In particular, with some examples, the fixed resource may access the mobile device while the fixed beacons transmit broadcasts that are received by the mobile device in order to determine the geo-location of the mobile device as part of implementing a geo-location access control system as described herein. Examples are not limited in this context and instead, the specific operations of the component of the system 1000 are provided to be illustrative of the claimed subject matter.

As depicted, the geo-location access system 1000 may comprise one or more of a mobile device 100, a fixed resource 200, a beacon array 300, and an access server 400. Furthermore, the system 1000 may be deployed, at least partially, within a physical space 500. It is worthy to note, that the beacons within the beacon array 300 may be deployed in various locations within the physical space 500. In particular, the beacons may be separate units and need not necessarily be a single unit as depicted in the figures. Additionally, although FIGS. 1-2 illustrate the fixed resource 200 and the access server 400 as single devices, the system 1000 may be implemented with multiple devices operably connected. In particular, the fixed resource 200 and/or the access server 400 may be implemented using multiple devices.

Figure 3:
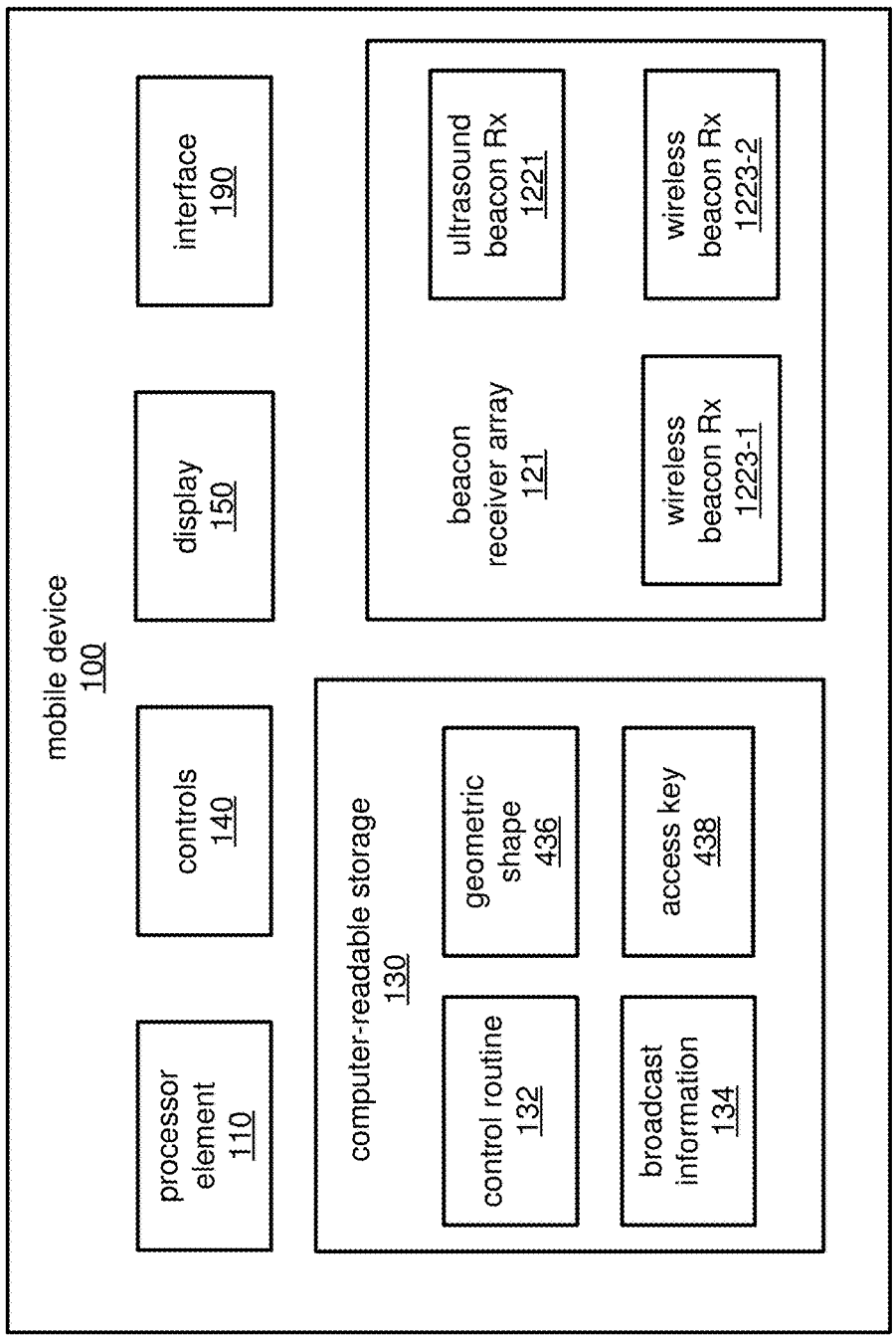
FIGS. 3-6 each illustrate a portion of the embodiments of the system of FIGS. 1-2.
Figure 4:
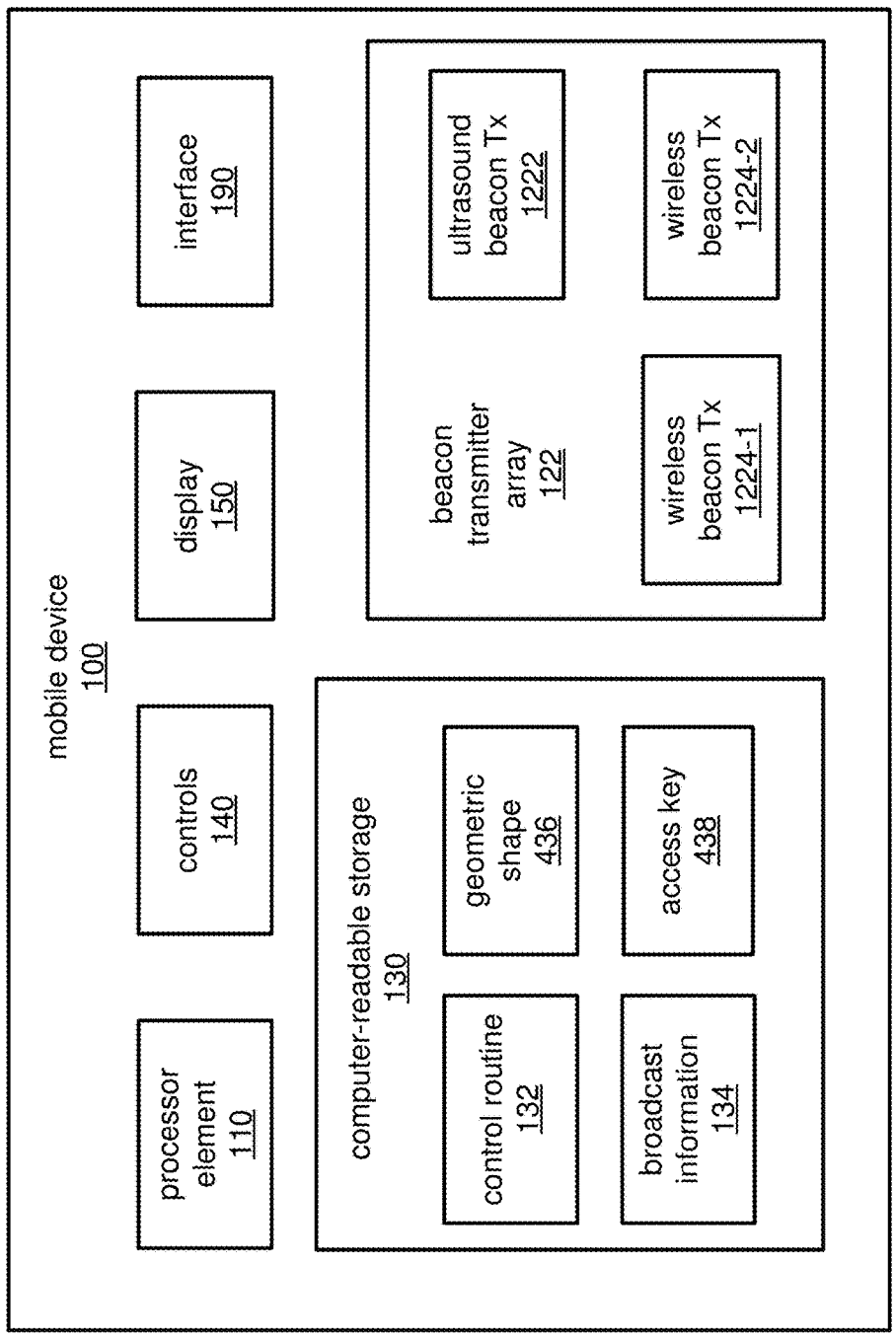
Figure 5:
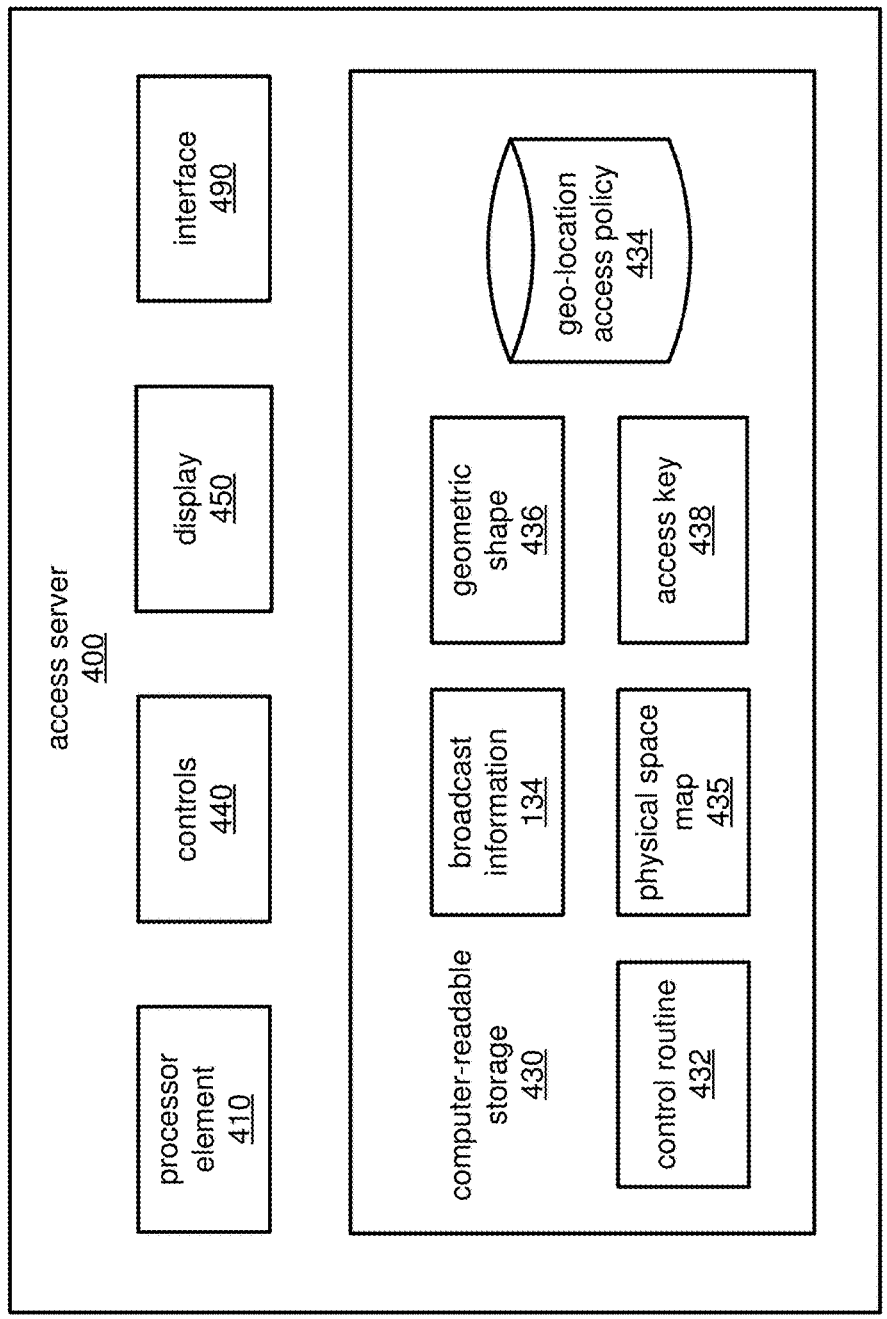
Figure 6:
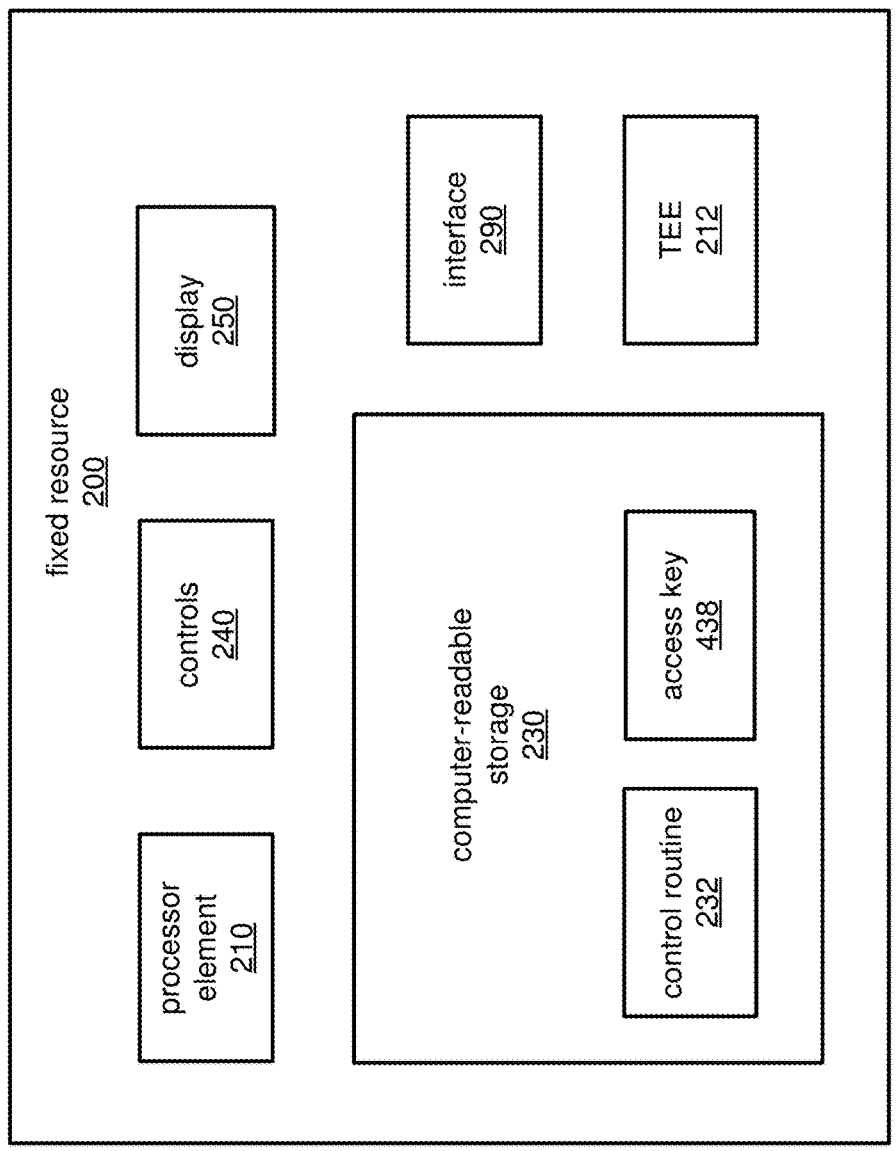

FIGS. 3-6 illustrate individual components of the system 1000 in greater detail. In particular, FIGS. 3-4 illustrate the mobile device 100; FIG. 5 illustrates the access server 400; and FIG. 6 illustrates the fixed resource 200. Description of the system 1000 in greater detail is now made with reference to FIGS. 1-6. Although care is taken to reference specific ones of these figures, it is noted that each of these figures are relevant to the description of the system 1000.

During operation, the mobile device 100, the fixed resource 200, the fixed beacon array 300, and the access server 400 may exchange signals including indications of ultrasound and/or wireless beacons, geometric shapes, geo-location security policies, access requests, and/or access tokens through network 999. It is to be appreciated, that although network 999 is indicated as wireless, ones of the components of the system 1000 may be operably coupled to each other through network 999 in a non-wired manner. Furthermore, ones of the components of the system 1000 may exchange signals unrelated to geo-location security with other components of the system 1000 and/or devices (not shown) outside the system 1000 through the network 999.

The mobile device 100 may be any of a variety of types of computing devices, including without limitation, a laptop computer, a netbook computer, an ultrabook computer, a tablet computer, a handheld personal data assistant, a smartphone, a digital camera, a mobile device, a body-worn computing device incorporated into clothing, a computing device integrated into a vehicle, a computing device integrated into a home appliance, or the like.

The fixed resource 200 and/or the access server 400 may be any of a variety of types of computing devices, including without limitation, a desktop computer, a computing terminal, a laptop computer, a netbook computer, an ultrabook computer, a tablet computer, a handheld personal data assistant, a smartphone, a digital camera, a mobile device, a body-worn computing device incorporated into clothing, a computing device integrated into a vehicle, a computing device integrated into a home appliance, a server, an array of server, a server implemented in a cloud computing environment, or the like.

Additionally, in some examples, the fixed resource 200 may be an application executing on a computing device. For example, the fixed resource may be a software application, a suite of software applications, an intranet or Internet portal, a portal to a secured network (e.g., VPN, or the like), etc.

Turning more specifically to FIG. 3, with various examples, the mobile device 100 incorporates one or more of processor element 110, beacon receiver array 121, storage 130, controls 140, a display 150, and interface 190 to couple the computing device 100 to the network 999. The beacon receiver array 121 includes an ultrasound beacon receiver 1221 and a number of wireless beacon receivers 1223-a. The storage 130 stores one or more of a control routine 132, beacon information 134, geometric shape 436, and an access key 438. In general, the control routine 132 incorporates a sequence of instructions operative on the processor element 110 to implement logic to perform various functions.

Turning more specifically to FIG. 4, with various examples, the mobile device 100 incorporates one or more of processor element 110, beacon transmitter array 122, storage 130, controls 140, a display 150, and interface 190 to couple the computing device 100 to the network 999. The beacon transmitter array 122 includes an ultrasound beacon transmitter 1222 and a number of wireless beacon transmitters 1224-a. The storage 130 stores one or more of a control routine 132, broadcast information 134, geometric shape 436, and an access key 438. In general, the control routine 132 incorporates a sequence of instructions operative on the processor element 110 to implement logic to perform various functions.

In general, in executing the control routine 132, the mobile device 100 receives (e.g., FIGS. 1 and 3) or transmits (e.g., FIGS. 2 and 4) broadcasts emitted from the fixed beacon array 300. For example, as depicted in FIG. 1, the fixed beacon array 300 can include an ultrasound beacon transmitter 322, and a number of wireless transmitters 324-a. Conversely, as depicted in FIG. 2, the fixed beacon array 300 can include an ultrasound beacon receiver 321, and a number of wireless receivers 323-a. Accordingly, during operation, an ultrasound broadcast 301 and/or a number of wireless broadcasts 303-a may be communicated between the fixed beacon array 300 and the mobile device 100. In executing the control routine 132, the mobile device 100 may receive the ultrasound beacon 301 and the wireless beacons 303. For example, the mobile device 100 may receive the ultrasound beacon 301, the first wireless beacon 303-1, and the second wireless beacon 303-2. The mobile device 100 may store information and/or indications of the broadcasts as broadcast information 134.

In some examples, in executing the control routine 132, the mobile device 100 may transmit the ultrasound broadcast 301, the first wireless broadcast 303-1, and the second wireless broadcast 303-2. The broadcasts (e.g., 301 and 303-a) may subsequently be received by the fixed beacon array 300 (e.g., refer to FIG. 2). The fixed beacon array 300 may provide broadcast information, to include indications of the broadcasts 301 and 303-a to the access server 400. The broadcast information 134 may be used to determine the location of the mobile device 100 in the physical space 500 based on the geometric shape 436 and further to determine whether access to the fixed resource (e.g., as in the case of FIG. 1) or access to the mobile device (e.g., as in the case of FIG. 2) is to be granted.

The operation of determining the geometric shape 436, aligning the shape with the physical space 500, and determining whether access to the fixed resource or the mobile device is to be granted is described in greater detail with respect to FIG. 5. In general, however, the geometric shape 436 corresponding to the location of the mobile device 100 is constructed and aligned with the physical space. If the location of the mobile device 100, based on the geometric shape 436, is within the portion of the physical space 500 designated as the allowed access area (e.g., the area 510), access to the fixed resource 200 and/or the mobile device 100 will be granted. If access is granted, the mobile device 100 and/or the fixed resource 200 may receive the access key 438 in order to access the fixed resource 200.

Turning more specifically to FIG. 5, in some examples, the access server 400 incorporates one or more of processor element 410, storage 430, and interface 490 to couple the access server 400 to the network 999. Additionally, the access server 400 may include controls 440 and display 450 to provide access to and/or a user interface for the access server 400. The storage 430 stores one or more of a control routine 432, broadcast information 134, geo-location access policy 434, physical space map 435, geometric shape 436, and the access key 438. In general, the control routine 432 incorporates a sequence of instructions operative on the processor element 410 to implement logic to perform various functions.

In executing the control routine 432, the processor element 410 is caused to receive the broadcast information 134, the broadcast information 134 to include indications of the ultrasound broadcast 301 and the wireless broadcast(s) 303-a (e.g., the first wireless broadcast 303-1 and the second wireless broadcast 303-2). As described above, the broadcast 301 may be an ultrasound broadcast. Additionally, the broadcasts 303-a may be any one of a variety of wireless broadcasts that can be triangulated. For example, with some embodiments the broadcast may be an RF broadcast (e.g., Bluetooth, WiFi, GPRS, GPS, or the like) and/or an IR broadcast. In a particular, example, the broadcast 301 may be an ultrasound broadcast, the broadcast 303-1 may be a WiFi broadcast and the broadcast 303-2 may be an IR broadcast.

Furthermore, in executing the control routine 432, the processor component 410 may construct the geometric shape 436 based on the broadcast information 134. In particular, the processor component may construct the geometric shape 436 from indications of the ultrasound broadcast 301 and indications of the wireless broadcast(s) 303-a. In some embodiments, the processor component 410 may form the geometric shape 436 from primitive shapes that may be inferred using singleton information corresponding to the broadcasts. For example, the access server 400 may implement geometry libraries (e.g., the computation geometry algorithms library, or the like) to construct the geometric shapes 436. Additionally, in executing the control routine 432, the processor component 410 aligns the geometric shape 436 with a map of the physical space 500 (e.g., the physical space map 435).

Said differently, the access server 400 may receive indications of the broadcasts 301 and 303-a from either the mobile device 100 or the fixed beacon array 300. The access server 400 may generate geometric shapes 436 based on these broadcasts 301 and 303-a. The geometric shapes 436 correspond to a location of the mobile device 100 within the physical space 500. The access server 400 may additionally align the geometric shapes 436 with the physical space map 435. Accordingly, a geo-location security policy (e.g., the geo-location access policy 434) may be implemented based on the location of the mobile device 100 within the physical space 500. More specifically, allowed access areas (e.g., the area 510) may be defined within the geo-location access policy 434 for one of more resources (e.g., the fixed resource 200, the mobile device 100, or the like). By aligning the geometric shapes 436 with the map of the physical space 435, the access server may determine whether the mobile device or the fixed resource are within the allowed access area 510 and correspondingly grant or deny an access request.

In executing the control routine 432, the processor component 410 may receive an access request from the mobile device 100 and determine whether the access request is authorized based on the geo-location access policy 434. In particular, the access request may include an indication of a request to access the fixed resource 200 by the mobile device 100. For example, the geo-location access policy 434 may include an indication that the mobile device 100 can access the fixed resource 200 while the mobile device 100 is within the area 510. Accordingly, if based on aligning the geometric shapes 436 with the map 435, the access server 400 determines that the mobile device 100 is within the area 510, access may be granted. An access key 438 (e.g., OAuth2 token, Kerberos ticket, or the like) may be provided to the mobile device 100. Conversely, if based on aligning the geometric shapes 436 with the map 435, the access server 400 determines that the mobile device 100 is not within the area 510, access may be denied and the access key 438 not provided to the mobile device 100.

In executing the control routine 432, the processor component 410 may receive an access request from the fixed resource 200 and determine whether the access request is authorized based on the geo-location access policy 434. In particular, the access request may include an indication of a request to access the mobile device 100 by the fixed resource 200. The geo-location access policy 434 may include an indication that the fixed resource 200 can access the mobile device 100 while the mobile device 100 is within the area 510. Accordingly, if based on aligning the geometric shapes 436 with the map 435, the access server 400 determines that the mobile device 100 is within the area 510, access may be granted. An access key 438 (e.g., OAuth2 token, Kerberos ticket, or the like) may be provided to the fixed resource 200. Conversely, if based on aligning the geometric shapes 436 with the map 435, the access server 400 determines that the mobile device 100 is not within the area 510, access may be denied and the access key 438 not provided to the fixed resource 200.

Turning more specifically to FIG. 6, in some examples, the fixed resource 200 incorporates one or more of processor element 210, storage 230, and interface 290 to couple the fixed resource 200 to the network 999. Additionally, the fixed resource 200 may include controls 240 and display 250 to provide access to and/or a user interface for the fixed resource 200. Furthermore, the fixed resource 200 may include a trusted execution environment (TEE) 212 to provide secure storage and/or process execution, that may be accessed by the geo-location access control techniques as described herein. It is important to note, that the TEE 212 may be incorporated into the processor element 210 and/or the storage 230. Furthermore, it is to be appreciated, that more than one TEE may be implemented. Furthermore, a TEE may be implemented in other devices besides the fixed resource 200. However, for purposes of clarity, only the TEE 212 is depicted. The storage 230 stores one or more of a control routine 232 and the access key 438. In general, the control routine 232 incorporates a sequence of instructions operative on the processor element 210 to implement logic to perform various functions.

In executing the control routine 232, the processor element 210 may be caused to request access to the mobile device 100 and/or grant access to the mobile device 100 based on the access key 438. For example, the fixed resource 200 may be access by the mobile device 100 as described above by the mobile device providing the access key 438 to the fixed resource 200. Additionally, the fixed resource 200 may access the mobile device 100 by requesting access to the mobile device 100 through the access server 400 as described above.

In various embodiments, each of the processor elements 110, 210, and/or 410 may include any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor elements may include a multi-core processor (whether the multiple cores coexist on the same or separate dies), and/or a multi-processor architecture of some other variety by which multiple physically separate processors are in some way linked. Furthermore, in various embodiments any number of the processor elements 110, 210, and/or 410 may include a trusted execution environment (e.g., Intel CSE®, Intel ME®, Intel VT®, Intel SGX®, ARM TrustedZone®, or the like) to provide for the processing and/or storing of sensitive information. The trusted execution environment may be access using the geo-location techniques described herein.

In various embodiments, each of the beacons (e.g., may include any number of wireless beacons. For example, the ultrasound beacons (e.g., the ultrasound beacon 321, 322, 1221, and/or 1222) may be configured to transmit, receive, or both transmit and receive ultrasound signals (e.g., the broadcast 301). As will be appreciated, ultrasound broadcasts are measured using the Doppler effect. In particular, an ultrasound broadcast is measured using the Doppler effect of reflected ultrasound broadcasts. Furthermore, ultrasound is typically highly sensitive to obstructions. In various embodiments, the wireless beacons (e.g., the beacons 323-*a*, 324-*a*, 1223-*a*, and/or 1224-*a*) may be configured to transmit, receive, or both transmit and receive wireless signals (e.g., the broadcasts 303-*a*). In some examples, the wireless signals may correspond to RF signals and/or IR signals. As will be appreciated, RF signals are typically impervious to many types of obstructions. As such, a wireless broadcast based on RF may generally define a spherical geometric shape. IR broadcasts are highly sensitive to some types of obstructions (e.g., wood, cloth, concrete, metal, or the like) but less sensitive to other types of obstructions (e.g., glass, plastic, Plexiglas®, or the like).

In various embodiments, each of the storage 130, 230, and/or 430 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the controls 140, 240, and/or 440 and each of the displays 150, 250, and/or 450 may provide a user interface for an operator of the respective component (e.g., the mobile device 100, the fixed resource 200, the access server 400, or the like). The controls 140, 240, and/or 440 may be any of a variety of types of manually operable control including and not limited to one or more of a keyboard, mouse, keypad, touchpad, stylus, or the like. The display 150, 250, and/or 450 may be any of a variety of types of display devices including and not limited to a liquid crystal display (LCD), an electroluminescent (EL) display, a plasma display, etc. Further, it should be noted that the controls and the display might be combined into a single component such as a touchscreen display.

In various embodiments, each of the interfaces 190, 290, and/or 490 may employ any of a wide variety of signaling technologies enabling the components to be coupled through the network 999. In particular, the mobile device 100, fixed resource 200, and/or access server 400 may exchange signals (e.g., with a secured resource, with another computing device, or the like) conveying executable instructions and data associated with biometric authentication through the network 999.

In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission. Accordingly, the interfaces 190, 290, and/or 490 may include circuitry providing at least some of the requisite functionality to enable such coupling. However, the interfaces 190, 290, and/or 490 may also be at least partially implemented with sequences of instructions executed by the processor elements (e.g., to implement a protocol stack or other features). Where one or more portions of the network 999 employs electrically and/or optically conductive cabling, the interface may employ signaling and/or protocols conforming to any of a variety of industry standards, including without limitation, RS-232C, RS-422, USB, Ethernet (IEEE-802.3) or IEEE-1394. Alternatively or additionally, where one or more portions of the network 999 entails the use of wireless signal transmission, corresponding ones of these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. It should be noted that although the interface is depicted as a single block, it might include multiple interfaces that may be based on differing signaling technologies. This may be the case especially where one or more of these interfaces couples the components to more than one network, each employing differing communications technologies.

Figure 7:
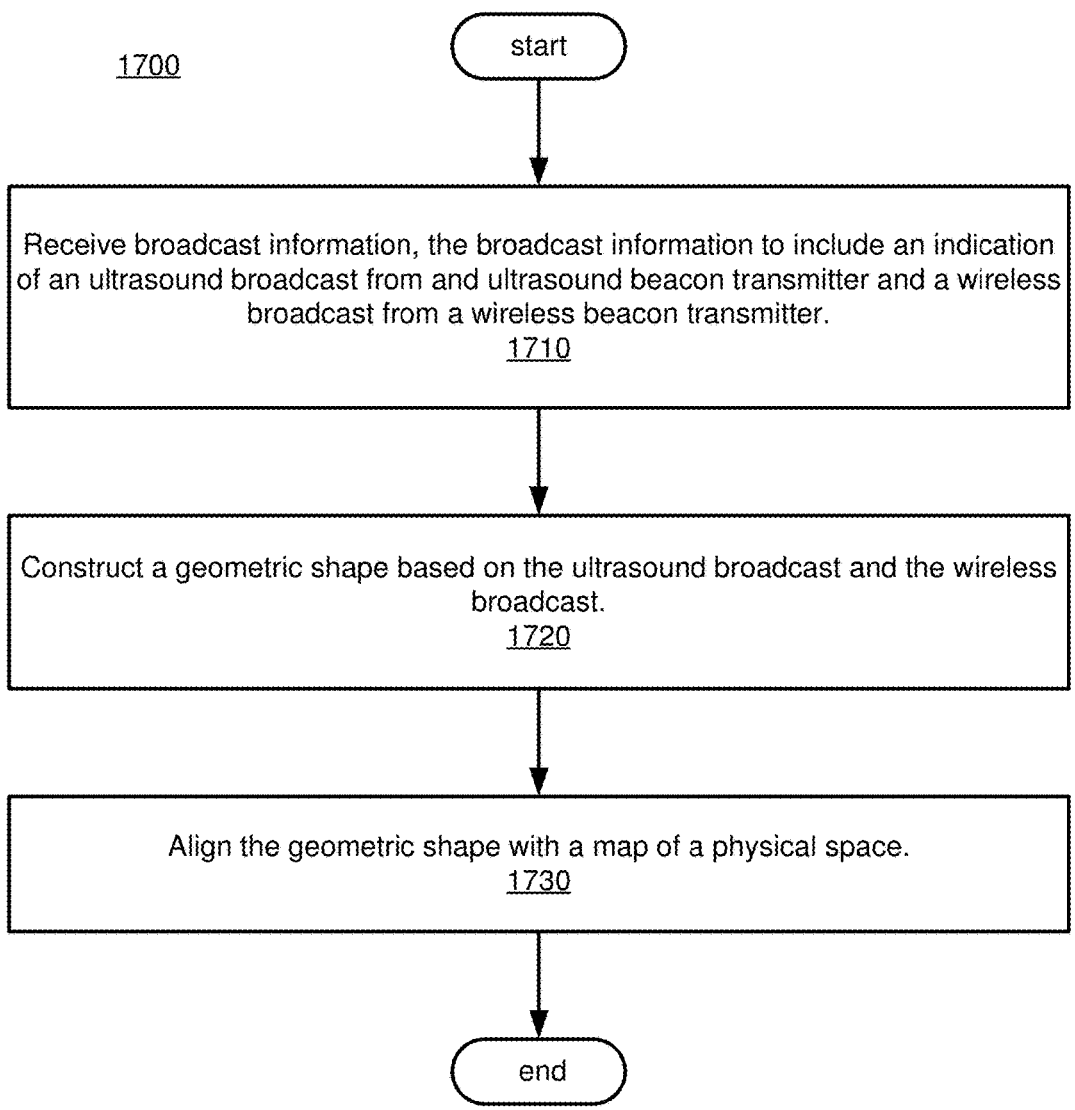
FIGS. 7-8 each illustrate embodiments of logic flows implemented by components of the system of FIGS. 1-2.
Figure 8:
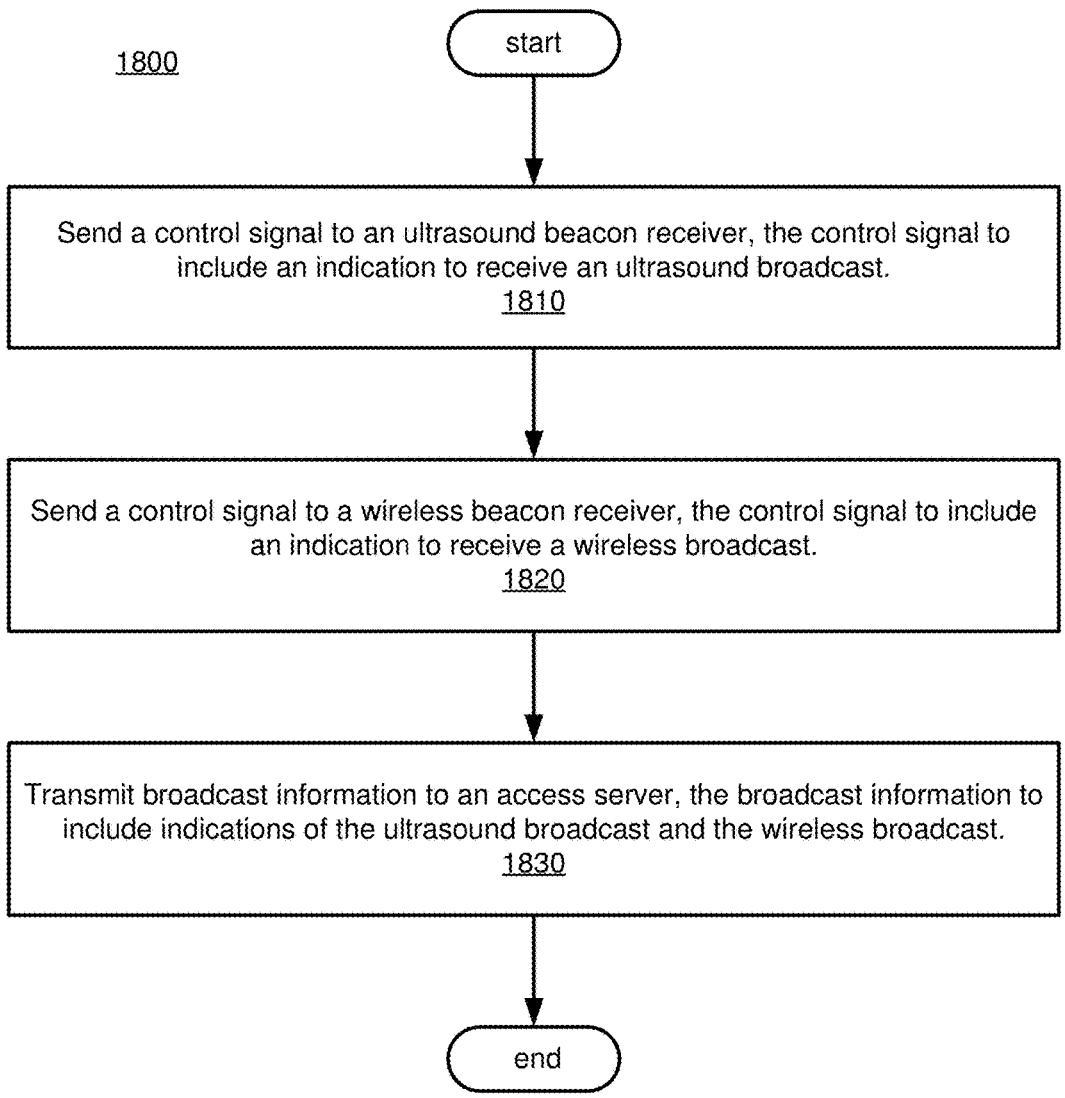

FIGS. 7-8 illustrate embodiments of logic flows for geo-location security as described herein. In particular, FIG. 7 illustrates a method 1700 for generating geometric shapes, aligning the geometric shapes to a map of a physical space, and determining whether to grant or deny access based on the aligned shapes while FIG. 8 illustrates a method 1800 for accessing a resource (e.g., the mobile device 100 or the fixed resource 200) using a geo-location access technique. It is to be appreciated, that the methods 1700 and 1800 are described with reference to FIGS. 1-6 and the system 1000. However, examples are not limited in this context and in particular, the methods 1700 and 1800 may be implemented by systems including similar or different components to the system 1000.

Turning more specifically to FIG. 7, the method 1700 may begin at block 1710. At block 1710, "receive broadcast information, the broadcast information to include indications of an ultrasound broadcast from an ultrasound beacon transmitter and a wireless broadcast from a wireless beacon transmitter," the control routine 432 may receive the broadcast information 134. The broadcast information to include indications of the broadcast 301 and the broadcast(s) 303-a. For example, in some implementations, the processor component 410, by execution of the control routine 432, may receive the broadcast information 134 from the mobile device 100. With some implementations, the processor component 410, by execution of the control routine 432, may receive the broadcast information 134 from the fixed beacon array 300.

Continuing to block 1720, "construct a geometric shape based on the ultrasound broadcast and the wireless broadcast," the access server 400 may construct the geometric shape 436 from indications of the broadcasts 301 and 303-a. For example, the processor component 410, by execution of the control routine 432, may form primitive geometric shapes representative of an area occupied by the mobile device 100 based on the broadcasts 301 and 303-a. The access server 400 may infer the primitive geometric shapes from singleton beaconing information corresponding to the broadcasts 301 and 303-a.

Continuing to block 1730, "align the geometric shape with a map of a physical space," the access server 400 may align the geometric shape 436 with the map of the physical space 435. In particular, the access server 400 may align the geometric shape with a portion of the map 435 corresponding to the geometric shape 436.

Turning more specifically to FIG. 8, the method 1800 may begin at block 1810. At block 1810, "send a control signal to an ultrasound beacon receiver, the control signal to include an indication to receive an ultrasound broadcast," the control routine 132 may communicate a control signal to the ultrasound beacon Rx 1221. The control signal to include an indication that the ultrasound beacon Rx 1221 is to receive the broadcast 301. Continuing to block 1820, "send a control signal to a wireless beacon receiver, the control signal to include an indication to receive a wireless broadcast," the control routine 132 may communicate a control signal to a wireless beacon Rx 1223-a, such as the wireless beacon Rx 1223-1 or the wireless beacon Rx 1223-2, for example. The control signal to include an indication that the wireless beacon Rx 1223-a is to receive the broadcast 303-a.

Continuing to block 1830, "transmit broadcast information to an access server, the broadcast information to include indications of the ultrasound broadcast and the wireless broadcast," the mobile device 100 may transmit the broadcast information 134 to the access server 400.

Figure 9:
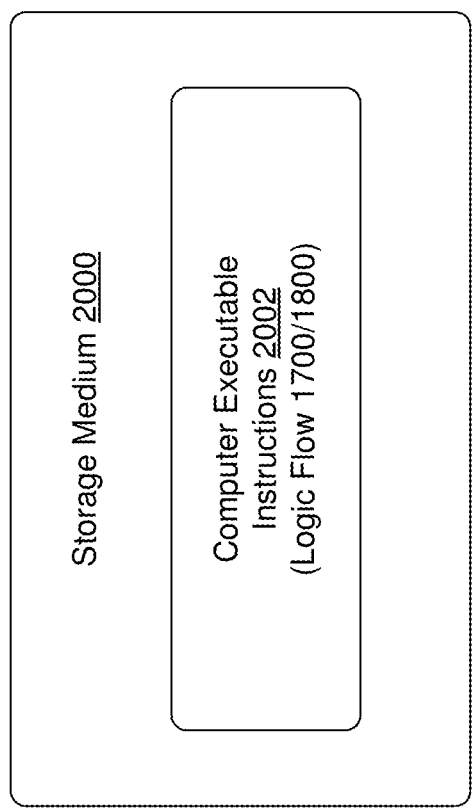
FIG. 9 illustrates an embodiment of computer-readable storage medium.

FIG. 9 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement logic flow 1700. In some examples, the storage medium 2000 may store various types of computer executable instructions to implement logic flow 1800.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
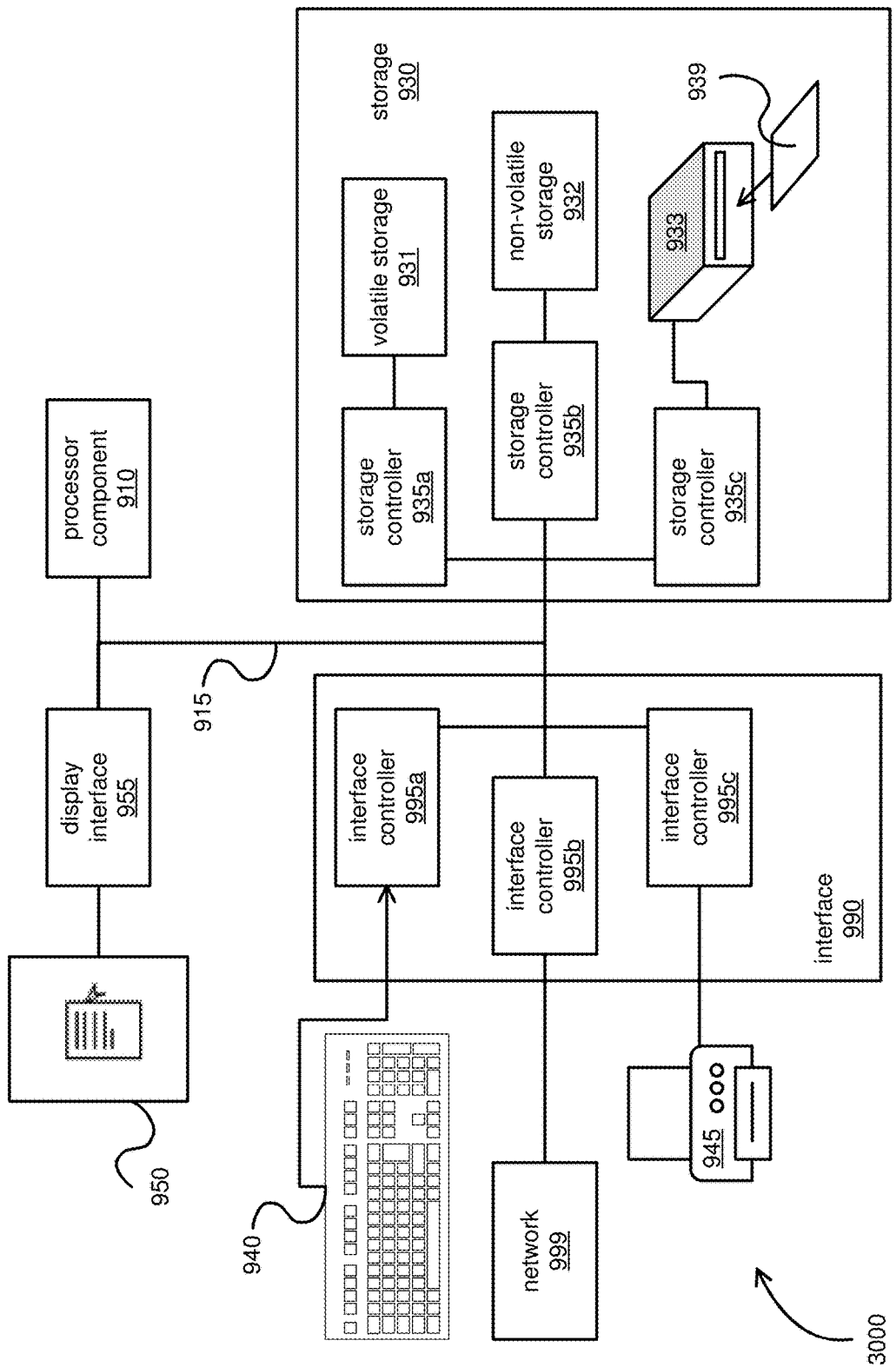
FIG. 10 illustrates an embodiment of a processing architecture.

FIG. 10 illustrates an embodiment of an exemplary processing architecture 3000 suitable for implementing various embodiments as previously described. More specifically, the processing architecture 3000 (or variants thereof) may be implemented as part of the mobile device 100, the fixed resource 200, and/or the access server 400. It should be noted that components of the processing architecture 3000 are given reference numbers in which the last two digits correspond to the last two digits of reference numbers of components earlier depicted and described as part of the previously described computing device. This is done as an aid to correlating such components of whichever ones of these computing devices may employ this exemplary processing architecture in various embodiments.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor element, the processor element itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3000, a computing device incorporates at least a processor element 910, a storage 930, an interface 990 to other devices, and coupling 915. Depending on various aspects of a computing device implementing the processing architecture 3000, including its intended use and/or conditions of use, such a computing device may further incorporate additional components, such as without limitation, a counter element 915.

The coupling 915 incorporates one or more buses, point-to-point interconnects, transceivers, buffers, crosspoint switches, and/or other conductors and/or logic that communicatively couples at least the processor element 910 to the storage 930. The coupling 915 may further couple the processor element 910 to one or more of the interface 990 and the display interface 955 (depending on which of these and/or other components are also present). With the processor element 910 being so coupled by couplings 915, the processor element 910 is able to perform the various ones of the tasks described at length, above, for whichever ones of the computing devices 100, 300 and 600 implement the processing architecture 3000. The coupling 915 may be implemented with any of a variety of technologies or combinations of technologies by which signals are optically and/or electrically conveyed. Further, at least portions of couplings 915 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor element 910 (corresponding to one or more of the processor elements 110, 210, and 410) may include any of a wide variety of commercially available processors, employing any of a wide variety of technologies and implemented with one or more cores physically combined in any of a number of ways.

As previously discussed, the storage 930 (corresponding to one or more of the storages 120, 230, and 430) may include one or more distinct storage devices based on any of a wide variety of technologies or combinations of technologies. More specifically, as depicted, the storage 930 may include one or more of a volatile storage 931 (e.g., solid state storage based on one or more forms of RAM technology), a non-volatile storage 932 (e.g., solid state, ferromagnetic or other storage not requiring a constant provision of electric power to preserve their contents), and a removable media storage 933 (e.g., removable disc or solid state memory card storage by which information may be conveyed between computing devices). This depiction of the storage 930 as possibly comprising multiple distinct types of storage is in recognition of the commonplace use of more than one type of storage device in computing devices in which one type provides relatively rapid reading and writing capabilities enabling more rapid manipulation of data by the processor element 910 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 931 is present and is based on RAM technology, the volatile storage 931 may be communicatively coupled to coupling 915 through a storage controller 935a providing an appropriate interface to the volatile storage 931 that perhaps employs row and column addressing, and where the storage controller 935a may perform row refreshing and/or other maintenance tasks to aid in preserving information stored within the volatile storage 931. By way of another example, where the non-volatile storage 932 is present and includes one or more ferromagnetic and/or solid-state disk drives, the non-volatile storage 932 may be communicatively coupled to coupling 915 through a storage controller 935b providing an appropriate interface to the non-volatile storage 932 that perhaps employs addressing of blocks of information and/or of cylinders and sectors. By way of still another example, where the removable media storage 933 is present and includes one or more optical and/or solid-state disk drives employing one or more pieces of removable machine-readable storage media 939, the removable media storage 933 may be communicatively coupled to coupling 915 through a storage controller 935c providing an appropriate interface to the removable media storage 933 that perhaps employs addressing of blocks of information, and where the storage controller 935c may coordinate read, erase and write operations in a manner specific to extending the lifespan of the machine-readable storage media 939.

One or the other of the volatile storage 931 or the non-volatile storage 932 may include an article of manufacture in the form of a machine-readable storage media on which a routine comprising a sequence of instructions executable by the processor element 910 may be stored, depending on the technologies on which each is based. By way of example, where the non-volatile storage 932 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 932 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor element 910 may initially be stored on the machine-readable storage media 939, and the removable media storage 933 may be subsequently employed in copying that routine to the non-volatile storage 932 for longer term storage not requiring the continuing presence of the machine-readable storage media 939 and/or the volatile storage 931 to enable more rapid access by the processor element 910 as that routine is executed.

As previously discussed, the interface 990 (corresponding to one or more of the interfaces 190, 290, and 490, as well as an interface incorporating the interface controllers 395a and 395b) may employ any of a variety of signaling technologies corresponding to any of a variety of communications technologies that may be employed to communicatively couple a computing device to one or more other devices. Again, one or both of various forms of wired or wireless signaling may be employed to enable the processor element 910 to interact with input/output devices (e.g., the depicted example keyboard 940 or printer 945) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995a, 995b and 995c. The interface controller 995a may employ any of a variety of types of wired digital serial interface or radio frequency wireless interface to receive serially transmitted messages from user input devices, such as the depicted keyboard 940. The interface controller 995b may employ any of a variety of cabling-based or wireless signaling, timings and/or protocols to access other computing devices through the depicted network 999 (perhaps a network comprising one or more links, smaller networks, or perhaps the Internet). The interface 995c may employ any of a variety of electrically conductive cabling enabling the use of either serial or parallel signal transmission to convey data to the depicted printer 945. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually incorporates) a display (e.g., the depicted example display 950), such a computing device implementing the processing architecture 3000 may also incorporate the display interface 955. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 955 in a communicative coupling of the display 950 may make use of signaling and/or protocols that conform to any of a variety of industry standards, including without limitation, any of a variety of analog video interfaces, Digital Video Interface (DVI), DisplayPort, etc.

More generally, the various elements of the computing devices 100, 200, and 400 may include various hardware elements, software elements, or a combination of both. Examples of hardware elements may include devices, logic devices, components, processors, microprocessors, circuits, processor elements, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The detailed disclosure now turns to providing examples that pertain to further embodiments. The examples provided below are not intended to be limiting.

Example 1

An apparatus to secure access based on a geographic location, the apparatus comprising a processor element; and logic executable by the processor element, the logic to receive broadcast information, the broadcast information to include indications of an ultrasound broadcast from an ultrasound beacon transmitter and a wireless broadcast from a wireless beacon transmitter; construct a geometric shape based on the ultrasound broadcast and the wireless broadcast; and align the geometric shape with a map of a physical space to form an allowed access area for a device.

Example 2

The apparatus of example 1, the logic to: receive a request to access a device in the physical space, the request to include an indication of a mobile device, the geometric shape corresponding to a geo-location of the mobile device in the physical space; determine whether the access request is authorized based on a geometric access policy; and provide an access token for the mobile device based on the determination that the access request is authorized.

Example 3

The apparatus of example 2, the request to include an indication to access a fixed resource from the mobile device.

Example 4

The apparatus of example 3, the geometric access policy to include an indication of a portion of the physical space in which access to the fixed resource is authorized.

Example 5

The apparatus of example 2, the request to include an indication to access the mobile device from a fixed resource.

Example 6

The apparatus of example 5, the geometric access policy to include an indication of a portion of the physical space in which access to the mobile device by the fixed resource is authorized.

Example 7

The apparatus of any one of examples 4 or 6, logic to determine whether the geometric shape is within the portion of the physical space; and authorize the access request based on the determination that the geometric shape is within the portion of the physical space; or deny the access request based on the determination that the geometric shape is not within the portion of the physical space.

Example 8

The apparatus of example 1, the wireless broadcast being a first wireless broadcast and the wireless beacon transmitter being a first wireless beacon transmitter, the broadcast information to further include indications of a second wireless broadcast from a second wireless beacon transmitter, the logic to construct the geometric shape based on the ultrasound broadcast, the first wireless broadcast, and the second wireless broadcast.

Example 9

The apparatus of example 8, wherein the first wireless broadcast and the second wireless broadcast are different.

Example 10

The apparatus of example 1, the wireless broadcast selected from a group comprising Bluetooth, WiFi, global packet radio service, global positioning system, and infrared.

Example 11

The apparatus of example 1, comprising a network interface coupled to the processor element, the network interface to communicate the broadcast information to the processor element.

Example 12

The apparatus of example 11, comprising a data path protector coupled to the network interface, the data path protector to secure the communication over the network interface.

Example 13

The apparatus of example 1, comprising a trusted execution environment coupled to the processor element, the trusted execution environment to secure the processor element.

Example 14

An apparatus for use in a geo-location security system, the apparatus comprising: a processor element; an ultrasound beacon receiver operably connected to the processor element; a wireless beacon receiver operably connected to the processor element; and logic executable by the processor element, the logic to: send a control signal to the ultrasound beacon receiver, the control signal to include an indication to receive an ultrasound broadcast; send a control signal to the wireless beacon receiver, the control signal to include an indication to receive a wireless broadcast; and transmit broadcast information to an access server, the broadcast information to include indications of the ultrasound broadcast and the wireless.

Example 15

The apparatus of example 14, the logic to transmit a request to access a fixed resource in a physical space.

Example 16

The apparatus of example 15, the logic to receive an access token to access the fixed resource from the access server.

Example 17

The apparatus of example 14, the logic to: receive a geometric shape from the access server, the geometric shape corresponding to a location of the apparatus within a physical space, the geographic shape constructed from indications of the ultrasound broadcast and the wireless broadcast; and align the geometric shape with a map of the physical space.

Example 18

The apparatus of example 17, the logic to: determine whether the geometric shape is within a portion of the physical space, the portion of the physical space corresponding to an area of allowed access to a fixed resource; and access the fixed resource based on the determination that the geometric shape is within the portion of the physical space.

Example 19

The apparatus of example 14, the wireless broadcast being a first wireless broadcast and the wireless beacon receiver being a first wireless beacon transmitter, the apparatus to include a second wireless beacon receiver operably coupled to the processor element, the logic to: send a control signal to the second wireless beacon receiver, the control signal to include an indication to receive a second wireless broadcast, the broadcast information to further include indications of the second wireless broadcast.

Example 20

The apparatus of example 19, wherein the first wireless broadcast and the second wireless broadcast are different.

Example 21

The apparatus of example 14, the wireless broadcast selected from the group consisting essentially of Bluetooth, WiFi, global packet radio service, global positioning system, and infrared.

Example 22

The apparatus of example 14, comprising a network interface coupled to the processor element, the network interface to communicate the broadcast information to the processor element.

Example 23

The apparatus of example 22, comprising a data path protector coupled to the network interface, the data path protector to secure the communication over the network interface.

Example 24

The apparatus of example 14, comprising a trusted execution environment coupled to the processor element, the trusted execution environment to secure the processor element.

Example 25

At least one machine-readable storage medium comprising instructions that when executed by an access server, cause the access server to: receive broadcast information, the broadcast information to include indications of an ultrasound broadcast from an ultrasound beacon transmitter and a wireless broadcast from a wireless beacon transmitter; construct a geometric shape based on the ultrasound broadcast and the wireless broadcast; and align the geometric shape with a map of a physical space.

Example 26

The at least one machine-readable storage medium of example 25, the access server caused to: receive a request to access a device in the physical space, the request to include an indication of a mobile device, the geometric shape corresponding to a geo-location for the mobile device in the physical space; determine whether the access request is authorized based on a geometric access policy; and provide an access token for the mobile device based on the determination that the access request is authorized.

Example 27

The at least one machine-readable storage medium of example 26, the request to include an indication to access a fixed resource from the mobile device.

Example 28

The at least one machine-readable storage medium of example 27, the geometric access policy to include an indication of a portion of the physical space in which access to the fixed resource is authorized.

Example 29

The at least one machine-readable storage medium of example 26, the request to include an indication to access the mobile device from a fixed resource.

Example 30

The at least one machine-readable storage medium of example 29, the geometric access policy to include an indication of a portion of the physical space in which access to the mobile device by the fixed resource is authorized.

Example 31

The at least one machine-readable storage medium of any one of examples 28 or 30, the access server caused to: determine whether the geometric shape is within the portion of the physical space; and authorize the access request based on the determination that the geometric shape is within the portion of the physical space; or deny the access request based on the determination that the geometric shape is not within the portion of the physical space.

Example 32

The at least one machine-readable storage medium of example 25, the wireless broadcast being a first wireless broadcast and the wireless beacon transmitter being a first wireless beacon transmitter, the broadcast information to further include indications of a second wireless broadcast from a second wireless beacon transmitter, the access server caused to construct the geometric shape based on the ultrasound broadcast, the first wireless broadcast, and the second wireless broadcast.

Example 33

The at least one machine-readable storage medium of example 32, wherein the first wireless broadcast and the second wireless broadcast are different.

Example 34

The at least one machine-readable storage medium of example 25, the wireless broadcast selected from the group consisting essentially of Bluetooth, WiFi, global packet radio service, global positioning system, and infrared.

Example 35

At least one machine-readable storage medium comprising instructions that when executed by a mobile device, cause the mobile device to: send a control signal to an ultrasound beacon receiver, the control signal to include an indication to receive an ultrasound broadcast; send a control signal to a wireless beacon receiver, the control signal to include an indication to receive a wireless broadcast; and transmit broadcast information to an access server, the broadcast information to include indications of the ultrasound broadcast and the wireless broadcast.

Example 36

The at least one machine-readable storage medium of example 25, the mobile device caused to transmit a request to access a fixed resource in a physical space.

Example 37

The at least one machine-readable storage medium of example 36, the mobile device caused to receive an access token to access the fixed resource from the access server.

Example 38

The at least one machine-readable storage medium of example 35, the mobile device caused to: receive a geometric shape from the access server, the geometric shape corresponding to a location of the apparatus within a physical space, the geometric shape constructed from indications of the ultrasound broadcast and the wireless broadcast; and align the geometric shape with a map of the physical space.

Example 39

The at least one machine-readable storage medium of example 38, the mobile device caused to: determine whether the geometric shape is within a portion of the physical space, the portion of the physical space corresponding to an area of allowed access to a fixed resource; and access the fixed resource based on the determination that the geometric shape is within the portion of the physical space.

Example 40

The at least one machine-readable storage medium of example 35, the wireless broadcast being a first wireless broadcast and the wireless beacon receiver being a first wireless beacon transmitter, the mobile device caused to send a control signal to a second wireless beacon receiver, the control signal to include an indication to receive a second wireless broadcast, the broadcast information to further include indications of the second wireless broadcast.

Example 41

The at least one machine-readable storage medium of example 40, wherein the first wireless broadcast and the second wireless broadcast are different.

Example 42

The at least one machine-readable storage medium of example 35, the wireless broadcast selected from the group consisting essentially of Bluetooth, WiFi, global packet radio service, global positioning system, and infrared.

Example 43

A computer-implemented method comprising: receiving broadcast information, the broadcast information to include indications of an ultrasound broadcast from an ultrasound beacon transmitter and a wireless broadcast from a wireless beacon transmitter; constructing a geometric shape based on the ultrasound broadcast and the wireless broadcast; and aligning the geometric shape with a map of a physical space.

Example 44

The computer-implemented method of example 43, comprising: receiving a request to access a device in the physical space, the request to include an indication of a mobile device, the geometric shape corresponding to a geo-location for the mobile device in the physical space; determining whether the access request is authorized based on a geometric access policy; and providing an access token for the mobile device based on the determination that the access request is authorized.

Example 45

The computer-implemented method of example 44, the request to include an indication to access a fixed resource from the mobile device.

Example 46

The computer-implemented method of example 45, the geometric access policy to include an indication of a portion of the physical space in which access to the fixed resource is authorized.

Example 47

The computer-implemented method of example 44, the request to include an indication to access the mobile device from a fixed resource.

Example 48

The computer-implemented method of example 47, the geometric access policy to include an indication of a portion of the physical space in which access to the mobile device by the fixed resource is authorized.

Example 49

The computer-implemented method of any one of examples 46 or 48, comprising: determining whether the geometric shape is within the portion of the physical space; and authorizing the access request based on the determination that the geometric shape is within the portion of the physical space; or denying the access request based on the determination that the geometric shape is not within the portion of the physical space.

Example 50

The computer-implemented method of example 43, the wireless broadcast being a first wireless broadcast and the wireless beacon transmitter being a first wireless beacon transmitter, the broadcast information to further include indications of a second wireless broadcast from a second wireless beacon transmitter, the method comprising constructing the geometric shape based on the ultrasound broadcast, the first wireless broadcast, and the second wireless broadcast.

Example 51

The computer-implemented method of example 50, wherein the first wireless broadcast and the second wireless broadcast are different.

Example 52

The computer-implemented method of example 43, the wireless broadcast selected from the group consisting essentially of Bluetooth, WiFi, global packet radio service, global positioning system, and infrared.

53

A computer-implemented method comprising: sending a control signal to an ultrasound beacon receiver, the control signal to include an indication to receive an ultrasound broadcast; sending a control signal to a wireless beacon receiver, the control signal to include an indication to receive a wireless broadcast; and transmitting broadcast information to an access server, the broadcast information to include indications of the ultrasound broadcast and the wireless broadcast.

Example 54

The computer-implemented method of example 53, comprising transmitting a request to access a fixed resource in a physical space.

Example 55

The computer-implemented method of example 54, comprising receiving an access token to access the fixed resource from the access server.

Example 56

The computer-implemented method of example 53, comprising: receiving a geometric shape from the access server, the geometric shape corresponding to a location of the apparatus within a physical space, the geometric shape constructed from indications of the ultrasound broadcast and the wireless broadcast; and aligning the geometric shape with a map of the physical space.

Example 57

The computer-implemented method of example 56, comprising: determining whether the geometric shape is within a portion of the physical space, the portion of the physical space corresponding to an area of allowed access to a fixed resource; and accessing the fixed resource based on the determination that the geometric shape is within the portion of the physical space.

Example 58

The computer-implemented method of example 53, the wireless broadcast being a first wireless broadcast and the wireless beacon receiver being a first wireless beacon transmitter, the method comprising sending a control signal to a second wireless beacon receiver, the control signal to include an indication to receive a second wireless broadcast, the broadcast information to further include indications of the second wireless broadcast.

Example 59

The computer-implemented method of example 58, wherein the first wireless broadcast and the second wireless broadcast are different.

Example 60

The computer-implemented method of example 53, the wireless broadcast selected from the group consisting essentially of Bluetooth, WiFi, global packet radio service, global positioning system, and infrared.

Example 61

An apparatus for a device in a geo-location security system, the apparatus comprising means for performing the method of any one of examples 43 to 60.

The invention claimed is:
1. An apparatus, comprising:
a memory; and
logic for a mobile device, the logic comprised in circuitry coupled to the memory, the logic to:
identify a fixed resource comprising a trusted execution environment (TEE) to access;
send a first control signal to an ultrasound beacon receiver, the first control signal to include an indication to receive an ultrasound broadcast;
send a second control signal to a wireless beacon receiver, the second control signal to include an indication to receive a wireless broadcast;
transmit the ultrasound broadcast with an ultrasound beacon transmitter;
measure reflections of the ultrasound broadcast using the Doppler effect and the ultrasound beacon receiver;
generate a first indication of the ultrasound broadcast based on the reflections of the ultrasound broadcast measured using the Doppler effect and the ultrasound beacon receiver;
transmit broadcast information to an access server, the broadcast information to include the first indication of the ultrasound broadcast and a second indication of the wireless broadcast; and
receive an access key to gain access to the TEE from the access server in response to transmission of the broadcast information to the access server.
2. The apparatus of claim 1, the logic to receive the first indication from the ultrasound beacon receiver and the second indication from the wireless beacon receiver.
3. The apparatus of claim 1, the logic to transmit the ultrasound broadcast and the wireless broadcast.
4. The apparatus of claim 1, the logic to:
receive a second wireless broadcast from a wireless beacon transmitter, the broadcast information to include a third indication of the second wireless broadcast.
5. The apparatus of claim 1, the logic to:
receive a second ultrasound broadcast from an ultrasound beacon transmitter, the broadcast information to include a third indication of the second ultrasound broadcast.
6. The apparatus of claim 1, the logic to transmit a request to access a fixed resource in a physical space.
7. The apparatus of claim 6, the logic to receive an access token to access the fixed resource from the access server.
8. The apparatus of claim 1, the logic to:
receive a geometric shape from the access server, the geometric shape corresponding to a location of the apparatus within a physical space, the geometric shape constructed from indications of the ultrasound broadcast and the wireless broadcast; and
align the geometric shape with a map of the physical space to determine the location of the apparatus within the physical space.
9. The apparatus of claim 8, the logic to:
determine whether the location of the apparatus is within a portion of the physical space, the portion of the physical space corresponding to an area of allowed access to a fixed resource; and
utilize the access key to access the fixed resource based on the determination that the location of the apparatus is within the portion of the physical space.
10. The apparatus of claim 1, the logic to send a third control signal to a second wireless beacon receiver, the third control signal to include an indication to receive a second wireless broadcast, the broadcast information to further include indications of the second wireless broadcast.
11. The apparatus of claim 1, the wireless broadcast comprising a broadcast via one or more of Bluetooth, WiFi, a global packet radio service, a global positioning system, and infrared.
12. A computer-implemented method, comprising:
identifying a fixed resource comprising a trusted execution environment (TEE) to access;
sending a first control signal to an ultrasound beacon receiver, the first control signal to include an indication to receive an ultrasound broadcast;
sending a second control signal to a wireless beacon receiver, the second control signal to include an indication to receive a wireless broadcast;
transmitting the ultrasound broadcast with an ultrasound beacon transmitter;
measuring reflections of the ultrasound broadcast using the Doppler effect and the ultrasound beacon receiver;
generating a first indication of the ultrasound broadcast based on the reflections of the ultrasound broadcast measured using the Doppler effect and the ultrasound beacon receiver;
transmitting broadcast information to an access server, the broadcast information to include the first indication of the ultrasound broadcast and a second indication of the wireless broadcast; and
receiving an access key from the access server to gain access to the TEE in response to transmission of the broadcast information to the access server.
13. The computer-implemented of claim 12, comprising receiving the first indication from the ultrasound beacon receiver and the second indication from the wireless beacon receiver.
14. The computer-implemented of claim 12, comprising transmitting the ultrasound broadcast and the wireless broadcast.

15. The computer-implemented of claim 12, comprising:
receiving a second wireless broadcast from a wireless beacon transmitter, the broadcast information to include a third indication of the second wireless broadcast.

16. The computer-implemented of claim 12, comprising:
receiving a second ultrasound broadcast from an ultrasound beacon transmitter, the broadcast information to include a third indication of the second ultrasound broadcast.

17. The computer-implemented of claim 12, comprising transmitting a request to access the fixed resource in a physical space.

18. At least one non-transitory computer-readable medium comprising a set of instructions that, in response to being executed by a processor circuit, cause the processor circuit to:
identify a fixed resource comprising a trusted execution environment (TEE) to access;
send a first control signal to an ultrasound beacon receiver, the first control signal to include an indication to receive an ultrasound broadcast;
send a second control signal to a wireless beacon receiver, the second control signal to include an indication to receive a wireless broadcast;
transmit the ultrasound broadcast with an ultrasound beacon transmitter;
measure reflections of the ultrasound broadcast using the Doppler effect and the ultrasound beacon receiver;
generate a first indication of the ultrasound broadcast based on the reflections of the ultrasound broadcast measured using the Doppler effect and the ultrasound beacon receiver;
transmit broadcast information to an access server, the broadcast information to include the first indication of the ultrasound broadcast and a second indication of the wireless broadcast; and
receive an access key to gain access to the TEE from the access server in response to transmission of the broadcast information to the access server.

19. The at least one non-transitory computer-readable medium of claim 18, comprising instructions that, in response to being executed by the processor circuit, cause the processor circuit to:
receive a geometric shape from the access server, the geometric shape corresponding to a location within a physical space, the geometric shape constructed from indications of the ultrasound broadcast and the wireless broadcast; and
align the geometric shape with a map of the physical space to determine the location within the physical space.

20. The at least one non-transitory computer-readable medium of claim 19, comprising instructions that, in response to being executed by the processor circuit, cause the processor circuit to:
determine the location is within a portion of the physical space, the portion of the physical space corresponding to an area of allowed access to a fixed resource; and
utilize the access key to access the fixed resource based on the determination that the location is within the portion of the physical space.

21. The at least one non-transitory computer-readable medium of claim 18, comprising instructions that, in response to being executed by the processor circuit, cause the processor circuit to send a third control signal to a second wireless beacon receiver, the third control signal to include an indication to receive a second wireless broadcast, the broadcast information to further include indications of the second wireless broadcast.

22. The at least one non-transitory computer-readable medium of claim 18, the wireless broadcast comprising a broadcast via one or more of Bluetooth, WiFi, a global packet radio service, a global positioning system, and infrared.

* * * * *